United States Patent
Gielniewski

(10) Patent No.: US 9,061,835 B2
(45) Date of Patent: Jun. 23, 2015

(54) DOCKING STATION OF A CLEANING DEVICE, METHOD OF STORING AND LEADING-IN THE CLEANING DEVICE AS WELL AS THE CLEANING DEVICE TO BE USED TOGETHER WITH THE DOCKING STATION

(75) Inventor: Adam Gielniewski, Radom (PL)

(73) Assignee: International Tobacco Machinery Poland Sp. z.o.o., Radom (PL)

( * ) Notice: Subject to any disclaimer, the term of this patent is extended or adjusted under 35 U.S.C. 154(b) by 182 days.

(21) Appl. No.: 13/634,979

(22) PCT Filed: Apr. 22, 2011

(86) PCT No.: PCT/PL2011/000042
§ 371 (c)(1),
(2), (4) Date: Oct. 3, 2012

(87) PCT Pub. No.: WO2011/136670
PCT Pub. Date: Nov. 3, 2011

(65) Prior Publication Data
US 2013/0037387 A1    Feb. 14, 2013

(30) Foreign Application Priority Data

Apr. 29, 2010    (PL) .......................................... 391104

(51) Int. Cl.
| | | |
|---|---|---|
| *B65G 47/71* | (2006.01) | |
| *B65G 45/10* | (2006.01) | |
| *B65G 45/24* | (2006.01) | |
| *A24C 5/35* | (2006.01) | |

(52) U.S. Cl.
CPC . *B65G 45/10* (2013.01); *A24C 5/35* (2013.01); *B65G 2201/0226* (2013.01)

(58) Field of Classification Search
None
See application file for complete search history.

(56) References Cited

U.S. PATENT DOCUMENTS

| | | | | |
|---|---|---|---|---|
| 3,889,240 | A | * | 6/1975 | Buchegger .................... 131/280 |
| 3,985,252 | A | * | 10/1976 | Hinchcliffe et al. .......... 414/403 |
| 6,374,990 | B1 | * | 4/2002 | Swinderman ................. 198/497 |

(Continued)

FOREIGN PATENT DOCUMENTS

| | | |
|---|---|---|
| DE | 10255572 A | 6/2004 |
| DE | 10 2005 018302 A1 | 10/2006 |

(Continued)

OTHER PUBLICATIONS

International search report in PCT/PL2011/000042 mailed Sep. 1, 2011.

(Continued)

*Primary Examiner* — Kavel Singh
(74) *Attorney, Agent, or Firm* — Oppedahl Patent Law Firm LLC

(57) ABSTRACT

Docking station (1) with a clearing device for a channel (4) for the mass flow of rod-shaped articles (5) used in the tobacco industry, provided with storage means (2) containing the clearing device (3) wherein the storage means are adapted in such a way that they are led in into the channel in response to a signal of presence of the end face of mass flow at the place at which the clearing device is led in or out; moving means (14) for inserting the clearing device into the channel after the storage means have been led in into the channel; furthermore, the storage means are adapted in such a way that they are led out of the installation channel in response to the signal of presence of the end face of the cleaning device in the channel.

14 Claims, 4 Drawing Sheets

(56) References Cited

Figure 1:
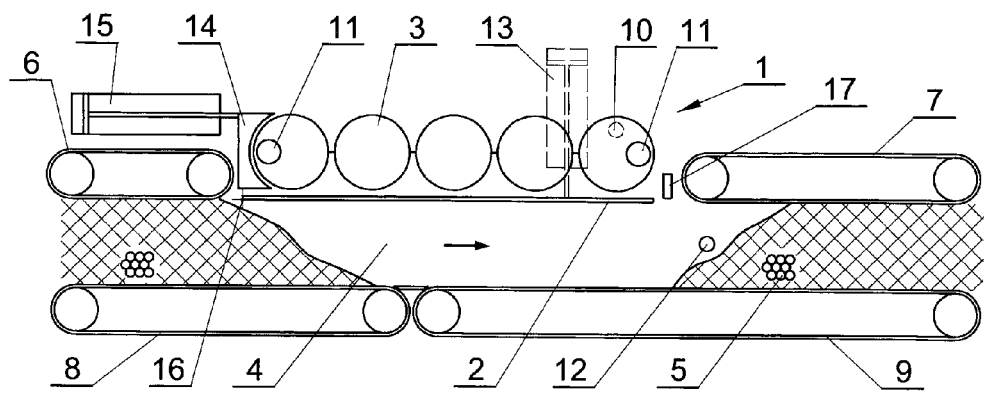

U.S. PATENT DOCUMENTS 7,011,205 B2 * 3/2006 Draghetti et al. ............ 198/778
2008/0286078 A1 11/2008 Kroessmann

FOREIGN PATENT DOCUMENTS

EP 1712141 A 10/2006
WO 03/053178 A1 7/2003

OTHER PUBLICATIONS

Written Opinion in PCT/PL2011/000042 mailed Sep. 1, 2011.

* cited by examiner

DOCKING STATION OF A CLEANING DEVICE, METHOD OF STORING AND LEADING-IN THE CLEANING DEVICE AS WELL AS THE CLEANING DEVICE TO BE USED TOGETHER WITH THE DOCKING STATION

The object of the invention is a docking station for a cleaning device, a method of storing and leading-in the cleaning device as well as the cleaning device to be used together with the docking station, in particular applicable in a cleaning process of an installation channel used in the tobacco industry.

A problem in the operation of installations in the tobacco industry is efficient and effective splitting of product brands. The transport channels for the mass flow of such products as cigarettes, filter rods, cigars or cigarillos are often very complex and in addition run above the operational stands and transport lines for operators operating these stands. The access to the beginning and the end of each section of transport channels, which require cleaning to remove the products when changing the product brand, is often difficult and takes time in each case. The access to connection zones of transporters forming a channel, which are susceptible to deposition of products, is also difficult.

That is why systematic cleaning of installations used in the tobacco industry is a routine practice. Moreover, cleaning is required each time before a change of the product brand—this activity was introduced for technological reasons, i.e. the removal of all products coming from previous production.

A standard solution known in the state of the art is the stoppage of the production line, manual leading-in into the installation channel of a sponge filling the channel in its cross-section and start of the installation with simultaneous observation of the movement of the sponge along the installation, then another stoppage of the installation and removal of the sponge at the other end of installation being cleaned.

A drawback of the known solution is first of all the necessity of stopping the installation and manual leading-in of the sponge into the installation channel. This operation causes downtimes and does not guarantee proper placing of the sponge in the transport channel. The damage of the last products of previously manufactured brand is unavoidable in the process, and besides it is necessary to stop the installation again in order to remove the sponge from the installation channel manually. Due to the difficult access to the installation channels, this operation also causes downtime.

In the state of the art, automatic cleaning devices and storage stations are known, however, solutions from the state of the art are characterized by the interference in mass flow of a product, e.g. filter rods, leading to the damage of a product batch situated directly in the field of operation of known devices.

From the publication WO 2003/05178, a platform leading in the cleaning device into the mass flow of e.g. filter rods is known, the station forces splitting of the mass flow by means of bars or a pair of frames forming free space into which a cleaning trolley can be led in.

A drawback of the known solution is mechanically forced splitting of the mass flow, which may lead to mechanical damage of transported products.

The object of the invention is to overcome the problems occurring in the state of the art, i.e. to avoid excessive downtimes of the installation used in the tobacco industry as well as to avoid the mechanical damage of products transported in the form of mass flow.

The object of the invention is a docking station for a cleaning device for the installation used in the tobacco industry, provided with storage means containing the cleaning device. The storage means are adapted in such a way that they are led in into the installation channel used in the tobacco industry in response to the signal of presence of the end face of mass flow at a place at which the cleaning device is led in or out. The docking station is provided with means initializing leading-in or leading-out of the cleaning device after the storage means have been led in into the installation channel used in the tobacco industry. Furthermore, the storage means are adapted in such a way that they are led out of the installation channel used in the tobacco industry in response to the signal of presence of the end face of the cleaning device in the installation channel.

The station according to the invention is characterized in that the storage means is a pivoting trough.

The station according to the invention is characterized in that the storage means is a principally horizontal platform moving in a direction principally perpendicular to the installation channel used in the tobacco industry.

The station according to the invention is characterized in that the storage means has the shape of a principally vertical funnel.

The station according to the invention is characterized in that in addition it contains a sensor producing a signal of the end face of mass flow.

The station according to the invention is characterized in that in addition it contains means of control producing a signal of the end face of mass flow based on data in the memory of the control unit.

The station according to the invention is characterized in that the means of control are adapted for producing the signal of the end face of mass flow based on a virtual model of mass flow in the installation channel used in the tobacco industry.

The station according to the invention is characterized in that the means initializing leading-in or leading-out of the cleaning device is a pusher.

The station according to the invention is characterized in that the means initializing leading-in or leading-out of the cleaning device is a transporting conveyor.

The station according to the invention is characterized in that it is provided with a sensor producing a signal of presence of the end face of the cleaning device in the installation channel used in the tobacco industry.

Furthermore, the object of the invention is a method of storage and leading-in of the cleaning device into the installation used in the tobacco industry, including the stages: storage of the cleaning device in the docking station in the storage position; producing of the signal of the end face of mass flow at the place at which the cleaning device is led in; leading-in of storage means into the installation channel in response to the signal of presence of the end face of mass flow; initialization through means initializing leading-in or leading-out of the cleaning device.

The method according to the invention is characterized in that leading-in of storage means into the installation channel is executed in response to the signal of presence of the end face of mass flow produced by the sensor of the end face of mass flow.

The method according to the invention is characterized in that leading-in of storage means into the installation channel is executed in response to the signal of presence of the end face of mass flow produced on the basis of data in the memory of the control unit.

The method according to the invention is characterized in that leading-in of storage means into the installation channel is executed in response to the signal of presence of the end face of mass flow produced on the basis of a virtual model of mass flow in the installation channel used in the tobacco industry.

Furthermore, the object of the invention is the cleaning device to be used in the docking station according to the invention, characterized in that it is provided at both ends with identification markers enabling the production of the signal of presence of the end face of the cleaning device in the installation channel used in the tobacco industry.

The advantage of the solution according to the invention is that it ensures minimization of the downtime related to cleaning of the installation channel in the tobacco industry by eliminating the necessity of manual placing of the cleaning device into the installation channel. The advantage is also the respectively repeatable placing of the device into the channel. Moreover, mechanical damage of transported products is avoided because both the station and the cleaning device are led in during natural breaks in production when hollow space occurs. Furthermore, the station may fulfill the function of a receiving station, which also contributes to considerable shortening of the duration of downtime related to extraction of the cleaning device from the installation channel.

Figure 2:
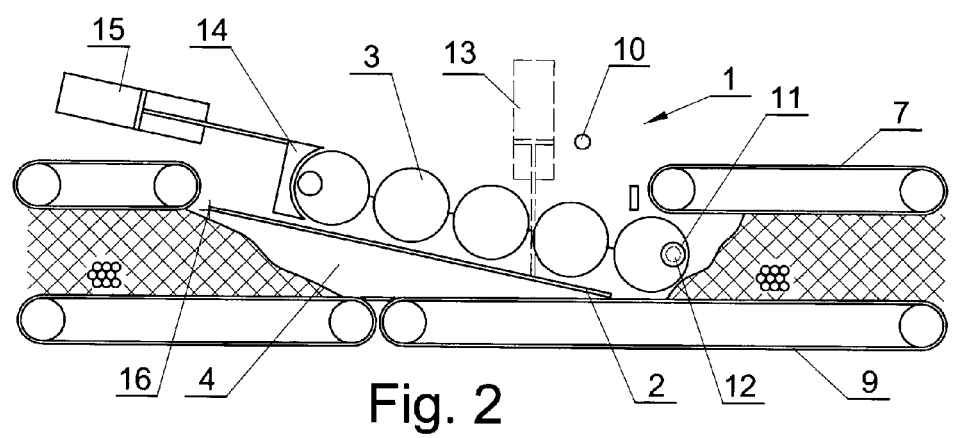
Figure 3:
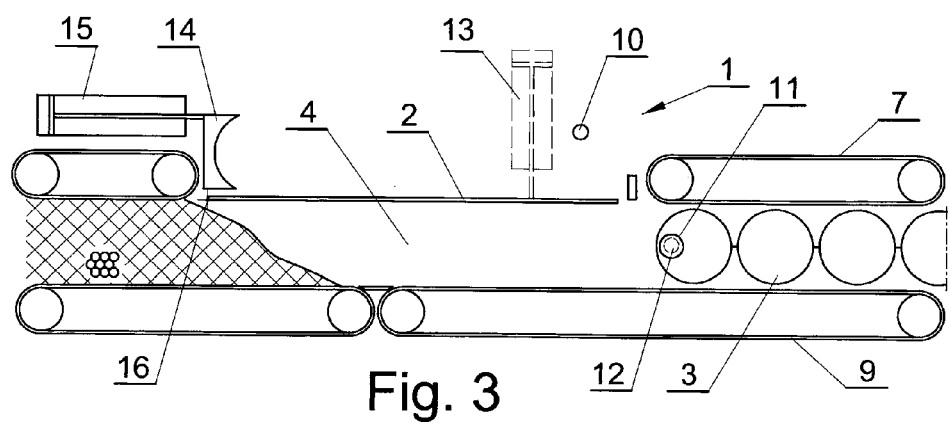
Figure 4:
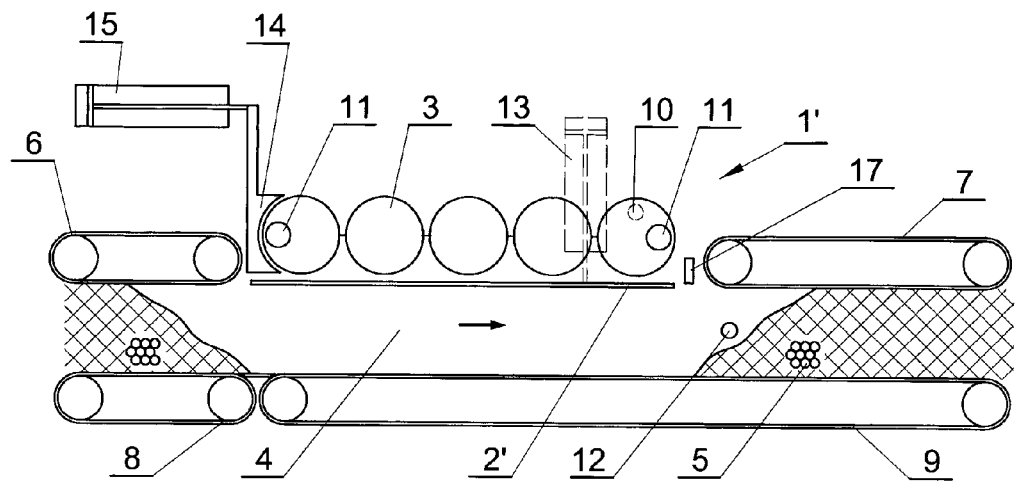
Figure 5:
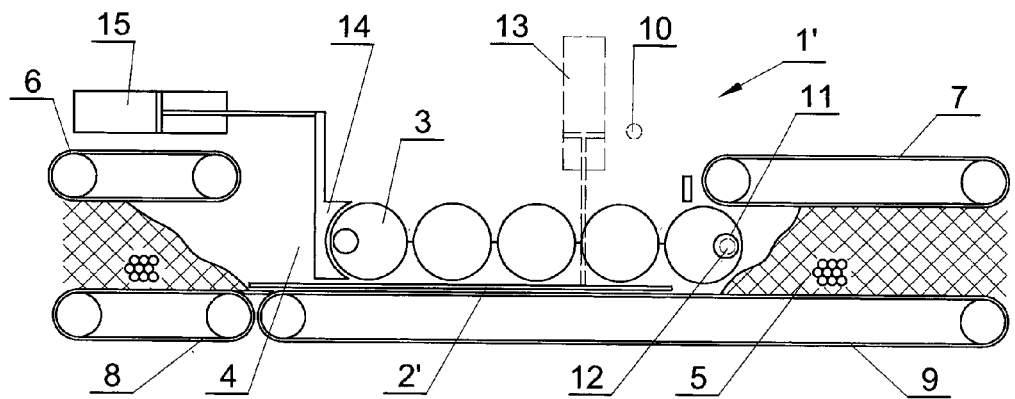
Figure 6:
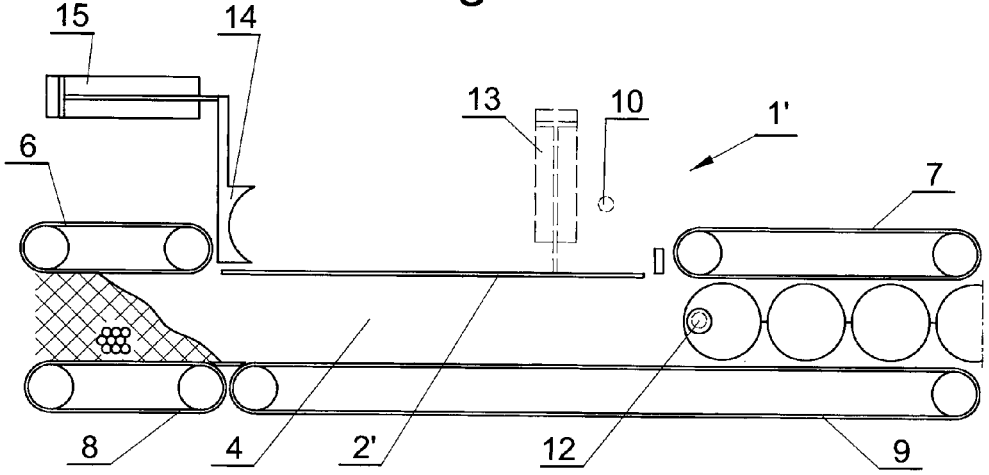
Figure 7:
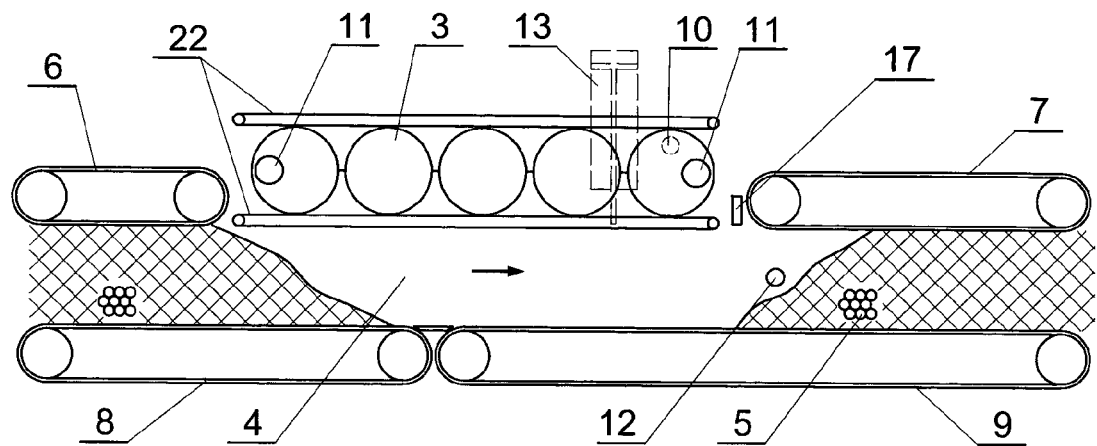
Figure 8:
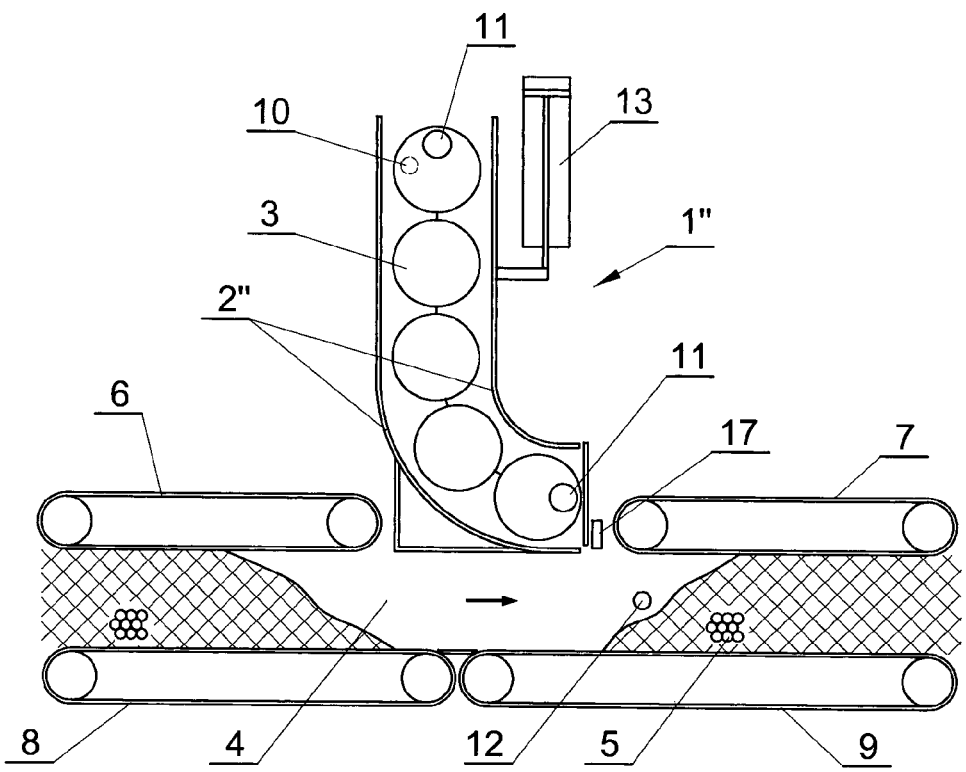
Figure 9:
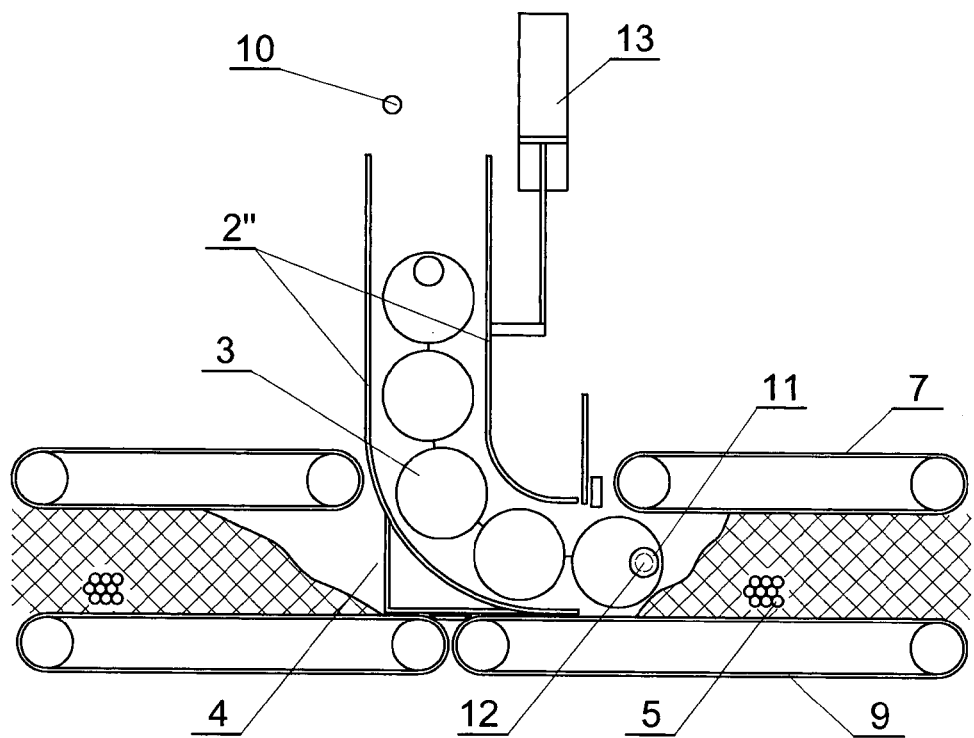
Figure 10:
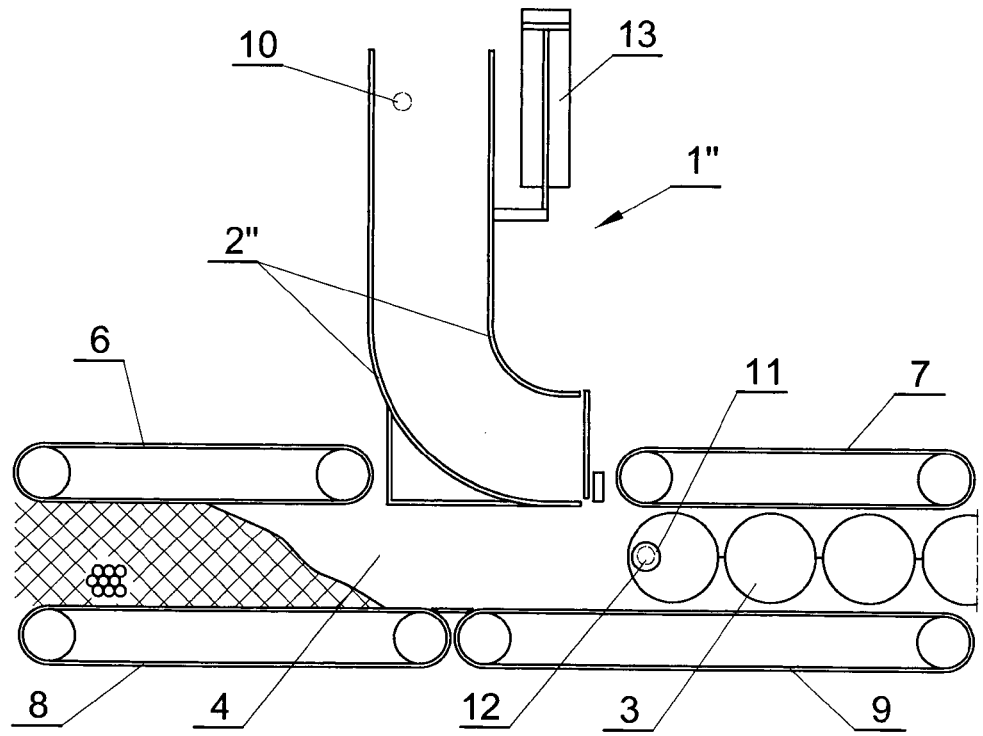

The object of invention has been described below in relation to preferred embodiments in the drawing in which:

FIG. 1 shows a docking station in the first embodiment together with a cleaning device placed inside, before leading-in the device into a transporting channel;

FIG. 2 shows the device of FIG. 1 when pulling the device out of the docking station has begun FIG. 3 shows the device of FIG. 1 after placing the cleaning device in the transporting channel FIG. 4 shows the docking station in the second embodiment together with the cleaning device placed inside, before leading-in the device into the transporting channel FIG. 5 shows the device of FIG. 4 when pulling the device out of the docking station has begun FIG. 6 shows the device of FIG. 4 after placing the cleaning device in the transporting channel FIG. 7 shows an alternative transporting system to be used both in the first and in the second embodiment of the invention, FIG. 8 shows the docking station in the third embodiment together with the cleaning device placed inside, before leading-in the device into the transporting channel FIG. 9 shows the device of FIG. 8 when pulling the device out of the docking station has begun FIG. 10 shows the device of FIG. 8 after placing the cleaning device in the transporting channel;

EMBODIMENT I

In FIG. 1 to FIG. 3, a docking station (1) provided with a trough (2) serving for stroing a multi-segment cleaning device (3) is shown. The trough (2) is situated above a transporting channel (4), with a bottom surface of the trough forming the top wall of the channel (4) for the mass flow of rod-shaped articles (5).

The channel (4) shown in FIG. 1 to FIG. 3, constituting a part of a transport route for rod-shaped articles (5), is shaped by belt conveyors. The top wall is shaped by a belt (6) before and a belt (7) behind the docking station (1), whereas the bottom wall of the channel (4) constitute belts (8) and (9), with the end of the belt (8) and the beginning of the belt (9) being situated within the docking station (1). The station (1) is provided with a sensor (10) controlling the presence of the cleaning device (3) on the trough (2), whereas the device itself is provided with identification markers (11) serving for the detection of the device (3) in the transporting channel (4) by means of a sensor (12). The markers (11) are situated at the outermost segments of the device (3) on both sides of these segments.

The docking station (1) is provided with an actuator (13) the function of which is to lower the trough (2) together with the cleaning device (3) situated on it. Furthermore, it is provided with a pusher (14), designated for pulling the device (3) out of the station (1), driven by an actuator (15). The trough (2) together with the actuator (15) are swing-mounted on a pivot (16) situated at the end of the trough (2). The docking station (1) is provided with a sensor (17) controlling the filling of the channel (4) with rod-shaped articles (5), situated above the surface of the top wall of the channel (4).

In the situation shown in FIG. 1 the mass flow in the channel (4) is interrupted, which has been detected by the sensor (17). The signal indicating the absence of rod-shaped articles (5) under the sensor (17) will constitute a permission to lead in the cleaning device (3).

FIG. 2 shows the situation after the trough (2) has been lowered by the actuator (13) and leading-in of the device (3) into the channel (4) by the actuator (15) using the pusher (14) has begun. The function of the sensor (12) is to detect the markers (11) mounted at the outermost segments of the cleaning device (3); in the situation in FIG. 2 the signal produced by the sensor (12) activated by the marker (11) is a signal indicating that the first segment of the device (3) has been led in into the transporting channel (4).

FIG. 3 shows the situation when the whole cleaning device (3) has been led in into the channel (4), and the marker (11) situated at the last segment is detected by the sensor (12); the signal produced by the sensor (12) indicates that the last segment of the device (3) has been led in into the transporting channel (4). The trough (2), driven by the actuator (13), is in the initial position, similarly, the actuator (15) together with the pusher (14) are in the initial position.

The operating principle of the device according to the first embodiment is described below. While rod-shaped articles in the form of mass flow (5) move in the channel (4), the docking station (1) of the cleaning device (3) is in its initial position, i.e. when the device (3) is in the station (1) on the trough (2) and is ready to be led in into the channel (4), which has been confirmed by a signal from the sensor (10) controlling the presence of the cleaning device (3). Rod-shaped articles (5) flow according to the direction of the arrow shown in FIG. 1. At the signal of termination or interruption of mass flow in the channel (4) coming from the sensor (17) the station (1) changes its position in order to enable leading-in of the device (3) into the channel (4). Namely, the actuator (13) lowers the trough (2) together with the device (3) situated on it. The information about termination or interruption of mass flow may also come from the memory of the actuator, e.g. from the shift register storing information about the mass flow in the transporting channel (4).

FIG. 2 shows the station (1) in a position when pulling the device (3) out of the docking station (1) and inserting of the device (3) into the channel (4) by means of the pusher (14) driven by the actuator (15) has begun. In the situation shown in FIG. 2, the marker (11) mounted on the first segment of the device (2) activates the sensor (12) controlling the presence of the device (3) in the channel (4), which results in sending to the control system of the signal indicating that leading-in of the cleaning device (3) into the channel (4) has begun. Leading-in of the cleaning device (3) into the transporting channel (4) continues, whereas, at a further stage, leading-in of the device (3) of the station (1) initialized by the movement of the actuator (15) is forced and continued by the movement of the belts (7) and (9) which pull the first segment of the device situated between these belts, and then pull successive segments. The cleaning device will move in the channel (4) behind the last rod-shaped articles (5) of the mass flow.

FIG. 3 shows a situation when the marker (11) situated at the last segment of the device (3), by moving before the sensor (12), activates this sensor, which results in producing the signal indicating that leading-in of the device (3) into the channel (4) has been completed. That way the control system receives the confirmation that the entire cleaning device has been led in into the channel (4). After the entire cleaning device (3) has been led in into the channel (4), the actuator (13) lifts the trough (2) to the initial position, and the actuator (15) also moves the pusher (14) to the initial position. However, the cleaning device continues to move in the channel (4) behind the mass flow of rod-shaped articles (5).

Embodiment II

In FIG. 4 to FIG. 6 a docking station (1') provided with a horizontal platform (2') serving as storage for the multi-segment cleaning device (3) is shown. The platform (2') is situated above the transporting channel (4), with the bottom surface of the platform (2') forming the top wall of the channel (4) for the mass flow of rod shaped articles (5).

The channel (4) shown in FIG. 4 to FIG. 6 is shaped by belt conveyors. The top wall is shaped by the belt (6) before and the belt (7) behind the docking station (1'), whereas the bottom wall of the channel (4) constitute the belts (8) and (9), with the end of the belt (8) and the beginning of the belt (9) being situated within the docking station (1'). The station (1') is provided with the sensor (10) controlling the presence of the cleaning device (3) on the platform (2'), whereas the device itself is provided with identification markers (11) serving for the detection of the device (3) in the transporting channel (4) by the sensor (12). The markers (11) are situated at the outermost segments of the device (3) on both sides of these segments. The docking station (1') is provided with the actuator (13) the function of which is to lower the platform (2') together with the cleaning device (3) situated on it. Furthermore, it is provided with the pusher (14) designated to pull out the device (3), driven by the actuator (15). The platform (2') together with the actuator (15) is mounted in such a way that it can move linearly in a direction principally perpendicular to the channel (4). The docking station (1') is provided with the sensor (17) controlling the filling of the channel (4) with rod-shaped articles (5), situated above the surface of the top wall of the channel (4).

In the situation shown in FIG. 4, the mass flow in the channel (4) has been interrupted, which has been detected by the sensor (17). The signal indicating the absence of rod-shaped articles (5) will constitute the permission to lead in the cleaning device (3). FIG. 5 shows the situation after the platform (2') has been lowered by the actuator (13) and after leading-in of the device (3) into the channel (4) by the actuator (15) using the pusher (14) has begun. The function of the sensor (12) is to detect the identification markers (11) mounted at the outermost segments of the cleaning device (3).

In the situation in FIG. 5, the signal produced by the sensor (12) activated by the marker (11) is a signal indicating that the first segment of the device (3) has been led in into the transporting channel (4). FIG. 6 shows a situation when the entire cleaning device (3) has been led in into the channel (4) and the marker (11) situated at the last segment has been detected by the sensor (12); the signal produced by the sensor (12) indicates that the last segment of the device (3) has been led in into the transporting channel (4). The platform (2') driven by the actuator (13) is in the initial position, similarly, the actuator (15) together with the pusher (14) are in the initial position.

The operating principle of the device according to the second embodiment is described below. While rod-shaped articles (5) in the form of mass flow move in the channel (4), the docking station (1') of the cleaning device (3) is in its initial position, i.e. when the device (3) is in the station (1') on the platform (2') and is ready to be led in into the channel (4), which has been confirmed by a signal from the sensor (10) controlling the presence of the cleaning device (3). Rod-shaped articles (5) flow according to the direction of the arrow shown in the figure. At the signal of termination or interruption of mass flow in the channel (4), which is detected by the sensor (17), the station (1') changes its position in such a way as to enable leading-in of the device (3) into the channel (4). Namely, the actuator (13) lowers the platform (2') together with the device (3) situated on it. The information about termination or interruption of mass flow can come also from the memory of the control unit, e.g. from the shift register storing information about the mass flow in the transporting channel (4).

FIG. 5 shows the station (1') in a position when pulling out of the device (3) of the docking station (1') and inserting the device (3) into the channel (4) by means of the pusher (14) driven by the actuator (15) has begun. In the situation shown in FIG. 5, the identification marker (11) mounted at the first segment of the device (3) activates the sensor (12) controlling the presence of the device in the channel, which results in sending to the control system of the signal indicating that leading-in of the device (3) into the channel (4) has begun. Leading-in of the cleaning device into the transporting channel (4) is continued, whereas, at a further stage, leading-in of the device (3) of the station (1') initialized by the motion of the pusher (14) is forced and continued by the movement of the belts (7) and (9) pulling the first segment of the device (3) situated between these belts, and then they pull successive segments. The cleaning device (3) will move behind the last rod-shaped articles (5) of the mass flow.

FIG. 6 shows a situation when the marker (11) situated at the last segment of the device (3), by moving before the sensor (12), activates this sensor, which results in producing a signal indicating that leading-in of the device (3) into the channel (4) has been completed. In this way the control system receives the confirmation that the entire cleaning device has been led in into the channel (4). After the entire cleaning device (3) has been led in into the channel (4), the actuator (13) lifts the trough (2') to the initial position, and the actuator (15) also moves the pusher (14) to the initial position. However, the cleaning device continues to move in the channel (4) behind the mass flow of rod-shaped articles (5).

FIG. 7 shows an alternative transport system to be used both in embodiment I and II of the invention wherein conveying belts (22) are used, the function of which is to move the cleaning device (3) within the docking station (1), with the device (3) being situated between these belts. After the belts (22) together with the device (3) have been tilted or lowered by means of the actuator (13), the belts (22) initialize the movement of the device (3). After the first segment has been led in into the space of the channel (4), the device (3) is additionally pulled by the belts (7) and (9).

Embodiment III

A docking station (1"), shown in FIG. 8 to FIG. 10, for the cleaning device is provided with a funnel (2") serving for storing the multi-segment cleaning device (3). The bottom end of the funnel (2") forms the top wall of the transporting channel (4) for the mass flow of rod-shaped articles (5).

The channel (4) shown in FIG. 8 to FIG. 10, constituting a part of the transport route for rod-shaped articles (5), is shaped by belt conveyors. The top wall is shaped by the belt (6) before and the belt (7) behind the docking station (1"), whereas the bottom wall of the channel (4) constitute the belts (8) and (9), with the end of the belt (8) and the beginning of the belt (9) being situated within the docking station (1"). The station (1") is provided with the sensor (10) controlling the presence of the device (3) in the funnel (2"), whereas the device itself is provided with markers (11) serving for detection of the device (3) in the transporting channel (4) by the sensor (12). The markers (11) are situated at the outermost segments of the device (3) on both sides of these segments. The docking station (1") is provided with the actuator (13), the function of which is to lower the funnel (2") together with the cleaning device (3) situated in it. The funnel (2") is mounted in such a way that it can move linearly in the principally vertical direction. The docking station (1") is provided with the sensor (17) controlling the filling of the channel (4) with rod-shaped articles (5), situated above the surface of the top wall of the channel (4).

In the situation in FIG. 8, the mass flow in the channel (4) has been interrupted, which has been detected by the sensor (17). The signal indicating the absence of rod-shaped articles (5) under the sensor (17) will constitute the permission to lead in the cleaning device (3).

FIG. 9 shows the situation after the funnel (2") has been lowered by the actuator (13) and the device (3) has been inserted into the channel (4). The function of the sensor (12) is to detect the markers (11) mounted at the outermost segments of the cleaning device; in the situation in FIG. 9, a signal that will be produced by the sensor (12) activated by the marker (11) at the first segment of the device (3) will be the signal indicating that the first segment of the device (3) has been led in into the transporting channel (4).

FIG. 10 shows a situation when the entire cleaning device has been led in into the channel (4), and the marker (11) situated at the last segment has been detected by the sensor (12); a signal produced by the sensor (12) indicates that the last segment of the device (3) has been led in into the transporting channel (4).

The operating principle of the device according to the third embodiment is described below. While rod-shaped articles (5) in the form of mass flow move in the channel (4), the docking station (1") of the cleaning device (3) is in its initial position, i.e. when the device (3) is in the station (1") in the funnel (2") and is ready to be led in into the channel (4), which has been confirmed by a signal from the sensor (10) controlling the presence of the cleaning device (3). The articles flow according to the direction of the arrow shown in the figure. At the signal of termination or interruption of the mass flow (FIG. 8) in the channel (4), which is detected by the sensor (17), the station (1") changes its position in such a way as to enable leading-in of the device (3) into the channel (4). The actuator (13) lowers the funnel (2") together with the device (3) situated in it. Under the force of gravity, the cleaning device (3) comes out of the funnel (2") and its first segment slides into the channel (4) (FIG. 8) between the belts (7) and (9).

In the situation shown in FIG. 9, the marker (11) mounted at the first segment of the device (3) activates the sensor (12) controlling the presence of the device in the channel (4), which results in producing a signal indicating that leading-in of the device (3) into the channel (4) has begun. Leading-in of the cleaning device (3) into the transporting channel (4) is continued, whereas further pulling out of the device (3) of the station (1") is forced by the movement of the belts (7) and (9) which pull the first segment of the device situated between these belts, and then pull successive segments. The cleaning device (3) will move behind the last rod-shaped articles (5) of the mass flow.

FIG. 10 shows a situation when the marker (11) situated at the last segment of the device (3), by moving before the sensor (12), activates this sensor, which results in producing a signal indicating that leading-in of the device (3) into the channel (4) has been completed. After the entire cleaning device (3) has been led in into the channel (4), the actuator (13) lifts the funnel (2") to the initial position. However, the cleaning device continues to move in the channel (4) behind the mass flow of rod-shaped articles (5).

The docking station according to the first and the second embodiment operates in the receiving function without any modifications when they are installed below the transporting channel in "inverted" configuration. Its use in the receiving function above the channel requires additional catching means to be implemented, e.g. a hook, tooth or similar means enabling pulling the cleaning device into the docking station. On the other hand, the use of conveying belts as means initializing leading-in of the cleaning device into the docking station ensures in each case the proper operation in the receiving function even in "standard" configuration, i.e. above the transporting channel. The docking station according to the third embodiment ensures the operation in the receiving function in the configuration below the transporting channel.

LIST OF DESIGNATIONS 1, 1', 1"—docking station of the cleaning device
2—trough
2'—platform
2"—funnel
3—cleaning device
4—transporting channel
5—rod-shaped article
6, 7, 8, 9—belt conveyor
10—sensor of presence of the cleaning device in the docking station
11—marker of the cleaning device
12—detector of the end face of the cleaning device
13—actuator
14—pusher
15—actuator
16—axis of rotation of the trough
17—filling sensor of the transporting channel
22—conveying belts

The invention claimed is:

1. A docking station (1, 1', 1") for an installation used in the tobacco industry, provided with
 a storage means (2, 2', 2") for a cleaning device, (3), which comprises a series of interconnected cylinder-shaped cleaning segments,
 characterized in that
 the docking station (1, 1', 1") is adapted to receive
  a signal of presence of the end face of mass flow;
  a signal of presence of the end face of the cleaning device (3);
 and further comprises the means (14, 22) initializing leading-in or leading-out of the cleaning device (3) after the storage means (2, 2', 2") for the cleaning device has been led in into the channel (4) of the installation used in the tobacco industry to remove products from the channel (4); and the storage means (2, 2', 2") for the cleaning device (3) is further adapted in such a way that the storage means (2, 2', 2") for the cleaning device (3) is led in into a channel (4) of the installation used in the tobacco industry in response to the signal of presence of the end face of mass flow at the place where the cleaning device is led in or led out; and the storage means (2, 2', 2") for the cleaning device (3) is adapted in such a way that the storage means (2, 2', 2") for the cleaning device (3) is led out of the channel (4) of the installation used in the tobacco industry in response to the signal of presence of the end face of the cleaning device (3) in the channel (4) of the installation used in the tobacco industry.

2. The station as in claim 1 wherein the storage means for the cleaning device is a swing-mounted trough.

3. The station as in claim 1 wherein the storage means for the cleaning device is a principally horizontal platform moving in a direction principally perpendicular to the channel of the installation used in the tobacco industry.

4. The station as in claim 1 wherein the storage means for the cleaning device has the shape of a principally vertical funnel (2").

5. The station as in claim 1 which in addition contains a sensor (17) producing the signal of the end face of mass flow.

6. The station as in claim 1 which in addition contains control means producing the signal of presence of the end face of mass flow, based on data from a memory of a control unit.

7. The station as in claim 6 wherein the control means is adapted to produce the signal of presence of the end face of mass flow based on a virtual model of mass flow in the channel (4) of the installation used in the tobacco industry.

8. The station as in claim 1 wherein the means initializing leading-in or leading-out of the cleaning device (3) is a pusher (14).

9. The station as in claim 1 wherein the means initializing leading-in or leading-out of the cleaning device (3) is a transporting conveyor (22).

10. The station as in claim 1 characterized in that it is provided with a sensor (10) producing the signal of presence of the end face of the cleaning device (3) in the channel (4) of the installation used in the tobacco industry.

11. A method of storing and leading in of a cleaning device (3), comprising a series of interconnected cylinder-shaped cleaning segments, into the channel (4) of the installation used in the tobacco industry, including the steps of:

storing of the cleaning device (3) in a docking station (1, 1', 1") in a storage position;

producing of the signal of presence of the end face of mass flow at the place at which the cleaning device (3) is led in;

leading in of the storage means for the cleaning device (3) into the channel (4) of the installation used in the tobacco industry in response to the signal of presence of the end face of mass flow;

leading in of the cleaning device (3) into the channel (4) of the installation used in the tobacco industry with the aid of the means (14, 22) initializing leading-in or leading-out of the cleaning device (3).

12. The method as in claim 11 wherein leading in of the storage means (2, 2', 2") for the cleaning device (3) into the channel (4) of the installation used in the tobacco industry is executed in response to the signal of presence of the end face of mass flow produced by the sensor of the end face of mass flow.

13. The method as in claim 11 wherein leading in of the storage means (2, 2', 2") for the cleaning device (3) into the channel (4) is executed in response to the signal of presence of the end face of mass flow produced on the basis of data from the memory of the control unit.

14. The method as in claim 13 wherein leading in of the storage means (2, 2', 2") for the cleaning device (3) into the channel (4) is executed in response to the signal of presence of the end face of mass flow produced on the basis of a virtual model of mass flow in the channel of the installation used in the tobacco industry.

* * * * *